United States Patent
Kim et al.

(10) Patent No.: US 9,045,850 B2
(45) Date of Patent: Jun. 2, 2015

(54) CONTROLLING METHOD OF LAUNDRY DEVICE

(71) Applicants: Youngsuk Kim, Seoul (KR); Romon Son, Seoul (KR)

(72) Inventors: Youngsuk Kim, Seoul (KR); Romon Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 13/755,982

(22) Filed: Jan. 31, 2013

(65) Prior Publication Data
US 2013/0200834 A1    Aug. 8, 2013

(30) Foreign Application Priority Data
Feb. 7, 2012   (KR) .................. 10-2012-0012378

(51) Int. Cl.
*H02H 7/08* (2006.01)
*D06F 33/00* (2006.01)
*D06F 35/00* (2006.01)
*D06F 33/02* (2006.01)

(52) U.S. Cl.
CPC .............. *D06F 33/00* (2013.01); *D06F 33/02* (2013.01); *D06F 35/005* (2013.01); *Y02B 40/56* (2013.01)

(58) Field of Classification Search
CPC ..... D06F 33/02; D06F 37/203; D06F 39/087; D06F 2202/065; D06F 39/004; D06F 2058/289; Y02B 40/56; Y02B 40/72
USPC ......... 318/268, 270, 276, 445, 446, 455, 461, 318/482, 483; 68/12.02, 12.03, 12.05, 68/12.15, 15
See application file for complete search history.

(56) References Cited

U.S. PATENT DOCUMENTS

| | | | | |
|---|---|---|---|---|
| 4,607,408 A * | 8/1986 | Didier et al. | | 8/159 |
| 5,133,200 A * | 7/1992 | Tanaka et al. | | 68/12.03 |
| 5,207,764 A * | 5/1993 | Akabane et al. | | 68/20 |
| 5,887,456 A * | 3/1999 | Tanigawa et al. | | 68/20 |
| 6,032,494 A * | 3/2000 | Tanigawa et al. | | 68/12.06 |
| 6,516,484 B2 * | 2/2003 | Kwon | | 8/158 |
| 6,978,554 B2 * | 12/2005 | Stinnett et al. | | 34/527 |
| 7,376,997 B2 * | 5/2008 | Kim et al. | | 8/159 |
| 7,735,344 B2 * | 6/2010 | Omura et al. | | 68/12.04 |
| 7,984,628 B2 * | 7/2011 | Nishio et al. | | 68/12.01 |
| 2005/0132503 A1 | 6/2005 | Yang et al. | | |
| 2006/0156766 A1 * | 7/2006 | Ioku | | 68/15 |
| 2008/0216251 A1 * | 9/2008 | Kahm et al. | | 8/159 |
| 2009/0199350 A1 | 8/2009 | Fechler et al. | | |

FOREIGN PATENT DOCUMENTS

JP  2011-245268    12/2011
KR  10-2011-0016330 A   2/2011

* cited by examiner

*Primary Examiner* — Bentsu Ro
*Assistant Examiner* — Thai Dinh
(74) *Attorney, Agent, or Firm* — McKenna Long & Aldridge LLP

(57) ABSTRACT

There may be disclosed a controlling method of a laundry treating apparatus including a low speed rotation step of rotating a motor configured to rotate a drum mounted in a tub at a low speed; and a high speed rotation step of rotating the motor at a high speed, the high speed rotation step implemented after the low speed rotations step, wherein the high speed rotation step comprises an acceleration period in which a RPM of the motor is increased after the RPM of the motor reaches a target RPM of the low speed rotation speed, such that the amount of the additionally supplied wash water may be reduced and that the washing course can be implemented, using a small amount of wash water.

18 Claims, 9 Drawing Sheets

CONTROLLING METHOD OF LAUNDRY DEVICE

CROSS-REFERENCE TO RELATED APPLICATION

Pursuant to 35 U.S.C. §119(a), this application claims the benefit of Korean Patent Application No. 10-2012-0012378, filed on Feb. 7, 2012, which is hereby incorporated by reference as if fully set forth herein.

BACKGROUND

1. Field

Embodiments may relate to a controlling method of a laundry machine, more particularly, to a method for controlling a laundry machine that implements a washing course by using a relatively small amount of water.

2. Background

Generally, a laundry machine is an electric appliance used in removing dirt from laundry through an operation of water and detergent mixedly provided thereto.

Laundry machines may be categorized into agitator type laundry machines, pulsator type laundry machines and drum type laundry machines. In an agitator type laundry machine, an angitator vertically oriented from a center of a tub is rotated in a horizontal direction. In a pulsator type laundry machine, a disk-shaped pulsator oriented underneath a tub is rotated in a horizontal direction and a frictional force generated between water currents and laundry is used in washing laundry. In a drum type laundry machine, water, detergent and laundry are mixedly loaded in a drum and the drum having the water, detergent and laundry is rotated to wash the laundry.

Such a drum type laundry machine includes a cabinet for defining an exterior appearance thereof, a tub mounted in the cabinet to hold wash water and a drum mounted in the tub to receive laundry. The drum type laundry machine further includes a motor and a shaft that are provided behind the tub to rotate the drum.

The drum type laundry machine having the structure mentioned above may remove dirt contained in the laundry, using a frictional force between the wash water and the laundry, a frictional force between the laundry and the drum and a chemical action of the detergent.

Meanwhile, in case of the drum type laundry machine, a heater is provided to heat the wash water provided to the tub. When the is exposed outside, without being submerged in the wash water sufficiently, the heater and ambient air could be heated much and the temperature of the heater and the temperature of ambient air rises high disadvantageously. Accordingly, a level of the wash water has to be measured and the wash water has to be additionally supplied not to expose the heater outside, in case the measures water level is high.

However, when the laundry absorbs the wash water, the water level can be lowered temporarily. If the wash water is additionally supplied in every case of the lower water level, the amount of the wash water might be too much in comparison to the amount of the laundry or it takes much time to complete the water supply process disadvantageously.

SUMMARY

Accordingly, the embodiments may be directed to a laundry apparatus. An object of the present invention is to provide a controlling method of a laundry machine that can use a relatively less amount of wash water when implementing a washing course.

To achieve these objects and other advantages and in accordance with the purpose of the embodiments, as embodied and broadly described herein, a controlling method of a laundry treating apparatus includes a low speed rotation step of rotating a motor configured to rotate a drum mounted in a tub at a low speed; and a high speed rotation step of rotating the motor at a high speed, the high speed rotation step implemented after the low speed rotations step, wherein the high speed rotation step comprises an acceleration period in which a RPM of the motor is increased after the RPM of the motor reaches a target RPM of the low speed rotation speed.

In the low speed rotation step, the motor may be driven at the target RPM for a predetermined time period after the RPM of the motor reaches the target RPM.

A rolling motion or a tumbling motion may be implemented in the low speed rotation step. A filtration motion may be implemented in the high speed rotation step.

The low speed rotation step and the high speed rotation step may be implemented in a heating step. The low speed rotation step and the high speed rotation step may be implemented in a heating step, before a heater starts to drive.

A circulation valve may be open in a preset time period after the low speed rotations step starts.

The circulation valve may close a circulation passage until the circulation valve is open.

A water level inside the tub may be measured after the high speed rotations step finishes.

The low speed rotation speed may be realized for a longer time period than the high speed rotation step.

The low speed rotation step and the high speed rotation step may be implemented in a laundry soaking step. The low speed rotation step and the high speed rotation step may be implemented after a rolling motion is implemented.

The low speed rotation step and the high speed rotation step may be implemented in a laundry amount compensating step, after the laundry soaking step finishes.

In another aspect of the present invention, a controlling method of a laundry machine includes a low speed rotations step of rotating a motor configured to rotate a drum at a low speed to make laundry fall after rising a predetermined height along a rotational direction of a drum; and a high speed rotation step of rotating the motor at a high speed to make the laundry not separated from an inner circumferential surface of the drum, the high speed rotation step implemented after the low speed rotation step, wherein the high speed rotation step includes an acceleration period in which a RPM of the motor increases after the speed of the motor reaches a target RPM of the low speed rotation step, and a circulation valve is open in a preset time period after the low speed rotation step starts.

The time for which a circulation passage is open by the circulation valve may be shorter than the time for which the low speed step is complete.

The circulation valve may close the circulation passage before the high speed rotation step enters into the acceleration period.

A water level inside the tub is measured after the high speed rotation step finishes.

In a further aspect of the present invention, a controlling method of a laundry machine includes a low speed rotation step of rotating a motor configured to rotate a drum at a low speed to make laundry fall after rising a predetermined height along a rotational direction of a drum; and a high speed rotation step of rotating the motor at a high speed to make the laundry not separated from an inner circumferential surface of the drum, the high speed rotation step serially implemented after the low speed rotation step; and a heating step of driving a heater to heat wash water, wherein the high rotation step includes an acceleration period in which a RPM of the motor increases after the RPM of the motor reaches a target RPM of the speed rotation step, and a circulation valve is open in a preset time period after the low speed rotation step starts.

The low speed rotation step and the high speed rotation step may finish before the heater starts to drive in the heating step.

The circulation valve may close a circulation passage before the high speed rotations step enters into the acceleration period.

According to the present invention, the amount of the additionally supplied wash water may be reduced and the washing course can be implemented, using a small amount of wash water.

Furthermore, the time taken to supply the additional wash water can be reduced and the entire time taken to implement the washing course can be reduced accordingly.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
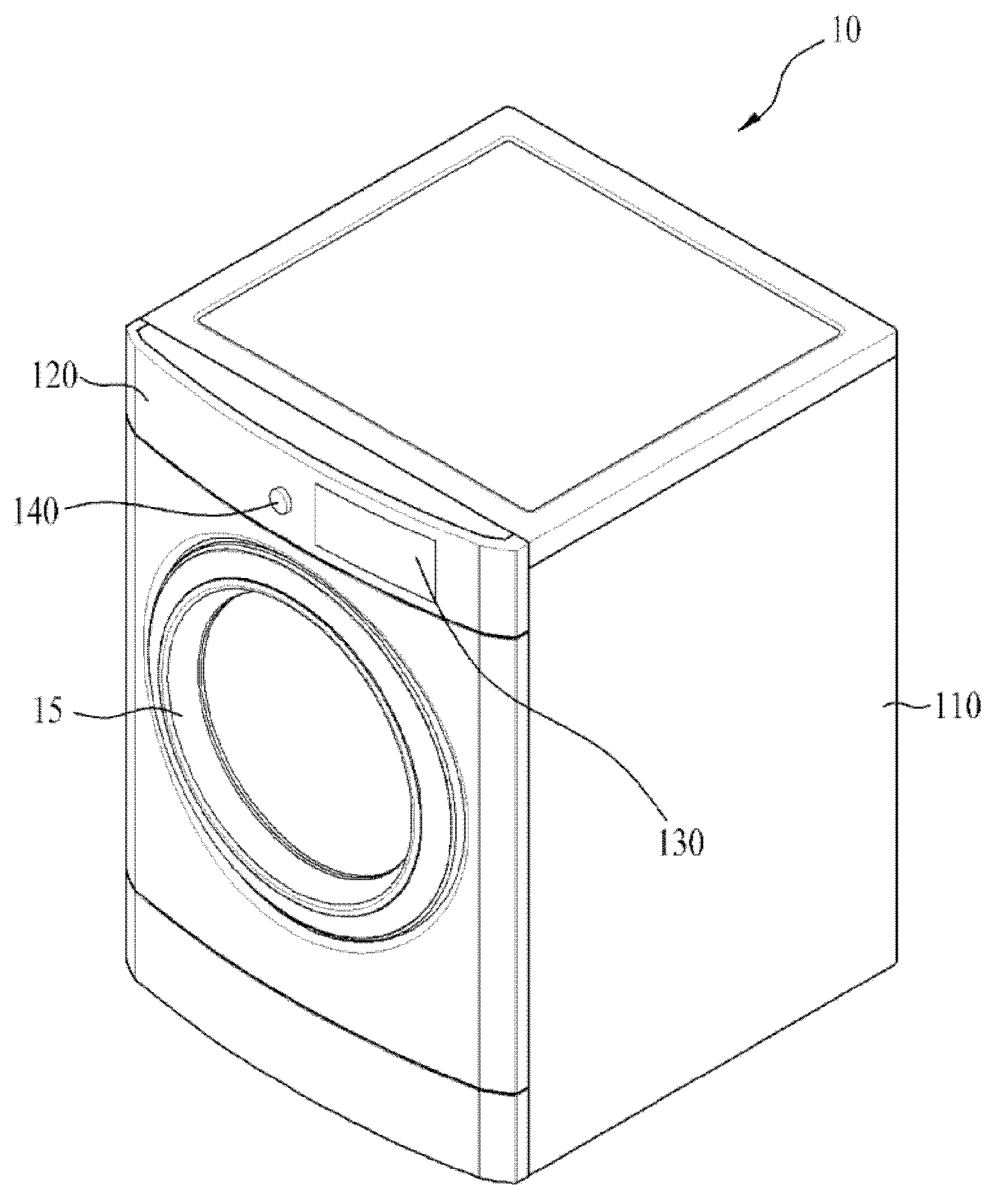
FIG. 1 is a perspective view illustrating a laundry apparatus according to one embodiment.

As follows, exemplary embodiments will be described in detail in reference to the accompanying drawings.

Reference may now be made in detail to specific embodiments, examples of which may be illustrated in the accompanying drawings. Wherever possible, same reference numbers may be used throughout the drawings to refer to the same or like parts.

A controlling method of a laundry machine according to one embodiment of the present invention includes a low-speed rotation step of rotating motor configured to rotate a drum mounted in a tub at a low speed; and a high speed rotation step of rotating the motor at a high speed, which is implemented after the low speed rotation step.

In this instance, the high speed rotation step includes an acceleration period in which a RPM of the motor increases after the speed of the motor reaches a target RPM set for the low speed rotation step.

In addition, a controlling method of a laundry machine according to another embodiment of the present invention includes a low speed rotation step of rotating a motor configured to rotate a drum at a low speed to make laundry fall after moving upward to a predetermined height along a rotational direction of a drum; and a high speed rotation step of rotating the motor at a high speed to make the laundry not separated from an inner circumferential surface of the drum, the high speed rotation step implemented after the low speed rotation step.

In this instance, the high speed rotation step includes an acceleration period in which a RPM of the motor increases after the speed of the motor reaches a target RPM set for the low speed rotation step. A circulation valve is open in a predetermined time after the low speed rotation step starts.

The time for which a circulation passage is open by the circulation valve may be shorter than the time for which the low speed step is complete.

Meanwhile, a controlling method of a laundry machine according to another embodiment of the present invention includes a low speed rotation step of rotating a motor configured to rotate a drum at a low speed to make laundry fall after moving upward to a predetermined height along a rotational direction of a drum; and a high speed rotation step of rotating the motor at a high speed to make the laundry not separated from an inner circumferential surface of the drum, the high speed rotation step implemented serially after the low speed rotation step; and a heating step of driving a heater to heat wash water.

The high rotation step includes an acceleration period in which a RPM of the motor increases after the speed of the motor reaches a target RPM set for the low speed rotation step. A circulation valve is open in a predetermined time after the low speed rotation step starts.

The low speed rotation step and the high speed rotation step may be complete before the heater starts to drive in the heating step.

Referring to the accompanying drawings, each of elements composing the laundry machine and various drum driving motions will be described in detail.

Figure 2:
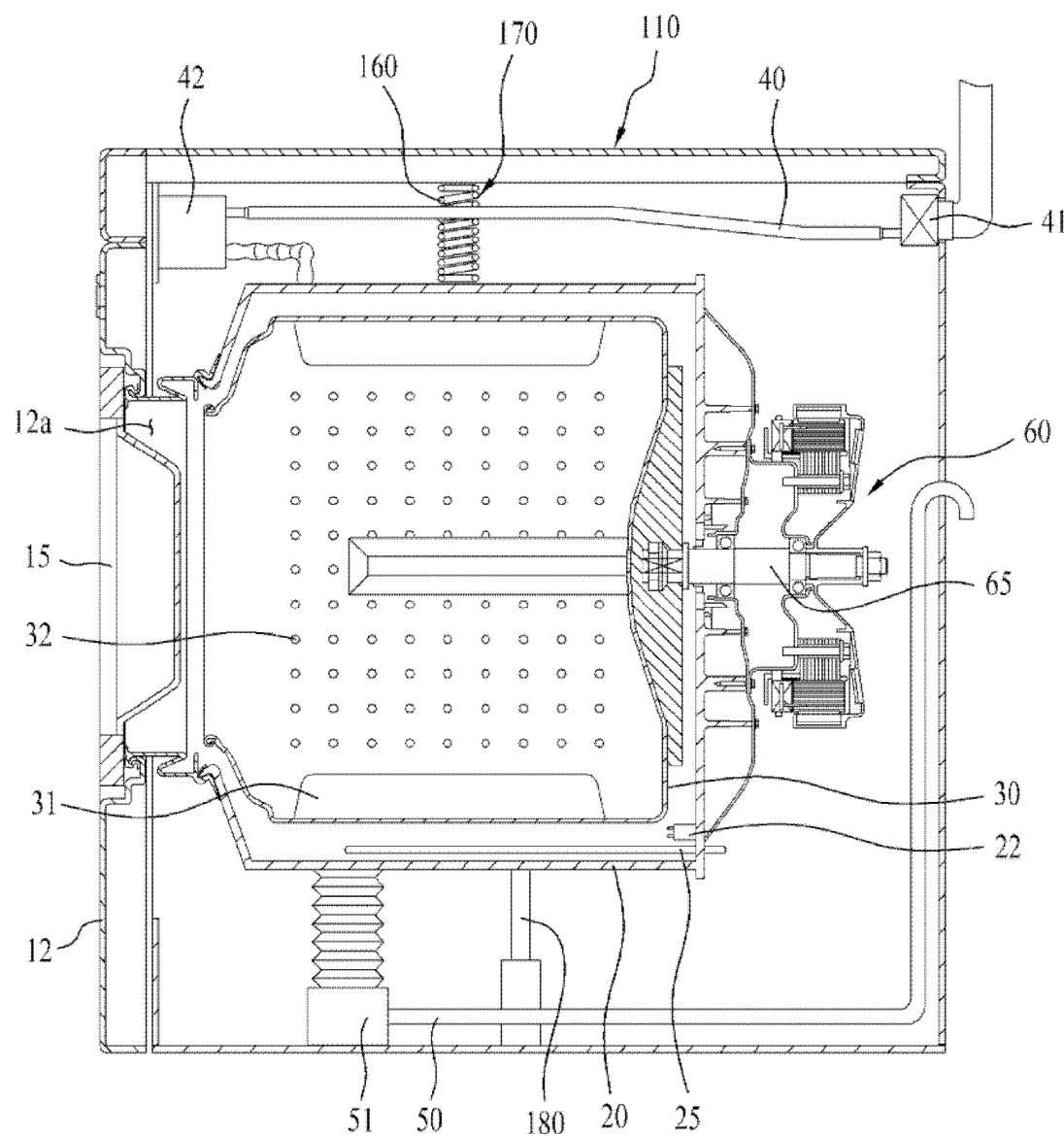
FIG. 2 is a side sectional diagram of FIG. 1.

FIG. 1 is a perspective view illustrating a laundry apparatus according to one embodiment. FIG. 2 is a side sectional diagram of FIG. 1.

Referring to FIGS. 1 and 2, the laundry machine 10 according to one embodiment includes a cabinet 110 for defining an exterior appearance thereof. The cabinet 110 defines an exterior appearance, namely, a profile of the laundry machine and various elements which will be described later will be provided in the cabinet 110.

A control panel 120 may be provided in a predetermined portion, for example, a front portion of the cabinet 110. The control panel 120 may be provided with a course selecting unit 140 configured to allow a user to select at least one of courses and a display unit 130 configured to display a variety of information thereon.

An opening 12a is formed in a front of the cabinet 110 and a door 15 is provided to open and close the opening 12a. A user may open the door 15 and load laundry into the laundry machine via the opening.

A tub 20 may be provided in the cabinet 110 to hold wash water. In case the laundry machine including the tub 20 provided in the cabinet 110, the tub may hold wash water.

Meanwhile, a drum 30 may be provided in the tub 20 and it may be rotatable in a clockwise and counter-clockwise direction. A lifter 31 is installed in an inner circumferential surface of the drum 30 to lift the laundry loaded in the drum 30 to a predetermined position and a plurality of penetrating holes 32 may be formed in the drum to exhaust the wash water from the drum 30 in cycles of a washing course, for example, a spinning cycle.

Accordingly, the drum 30 may provide a space containing the laundry and it may be rotated by a driving unit including a motor.

A driving unit 60 mounted in a rear portion of the tub 20, coupled to the drum 30 via a shaft 65 to rotate the drum 30. Recently, a direct drive type of the laundry machine including the driving unit including a motor provided in a rear wall of the tub to rotate the drum 30 has been adapted. Such a motor connection type is well-known and detailed description of the motor connection will be omitted accordingly.

In an upper portion of the tub may be provided a water supply hose 40 for supplying water to the tub from an external water supply source, a water supply valve 41 installed in the water supply hose 40 to control water supply and a detergent supply mechanism 42 for supplying detergent to the tub 20, together with the water supplied via the water supply hose 40. In a lower portion of the tub 20 may be provided a drainage hose 50 and a drainage pump 51 to drain the wash water used in washing and rinsing outside. In addition, in a predetermined area of the lower portion of the tub may be a heater 25 for adjusting the temperature of the wash water, a temperature sensor (not shown) for measuring the temperature of the wash water and an electrode sensor 22 for sensing the conductivity of the wash water.

Although not shown in the drawings, the tub 20 and the drum 30 may have a tilted structure that makes them tilted backward. In other words, rear portions of the tub 20 and the drum 30 are more tilted backward than front portions thereof. That is because the wash water had better be supplied from the rear portions to soak the laundry more quickly. In addition, in case the drum 30 is rotated, the laundry 30 is typically collected in a front portion of the drum 30 and the tilted structure can prevent the laundry from being collected in the front portion of the drum 30.

Meanwhile, the tub 20 may be supported by a flexible support member 170 positioned thereon and a damper 180 there beneath. When the drum 30 provided in the tub 20 is rotated, vibration may be generated by the rotation of the drum 30. Accordingly, the flexible support member 170 and the damper 180 may absorb the vibration and support the tub 20 and the drum 30 simultaneously.

Moreover, the laundry machine 10 may further include a control unit (not shown) configured to control the drum 30 and the other various elements. The controller may rotate the drum based on a course selected by the user or control operable components including various valves and the motor.

Figure 3:
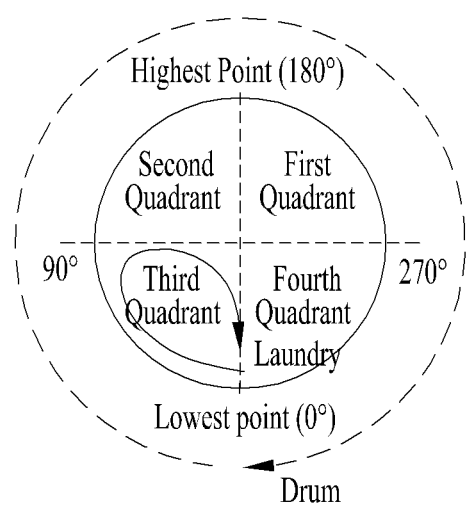
FIGS. 3 to 5 are diagrams illustrating a drum motion applied to a controlling method of a laundry machine according to the present invention.
Figure 4:
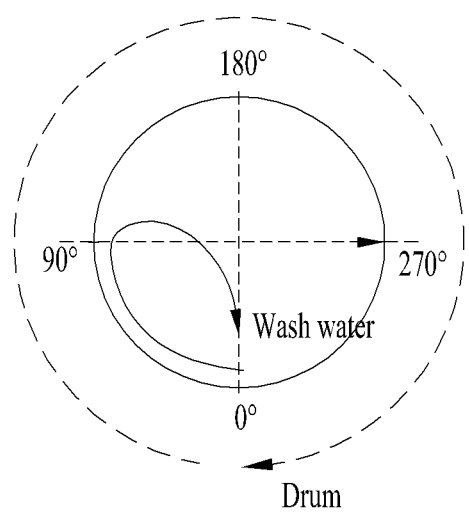
Figure 5:
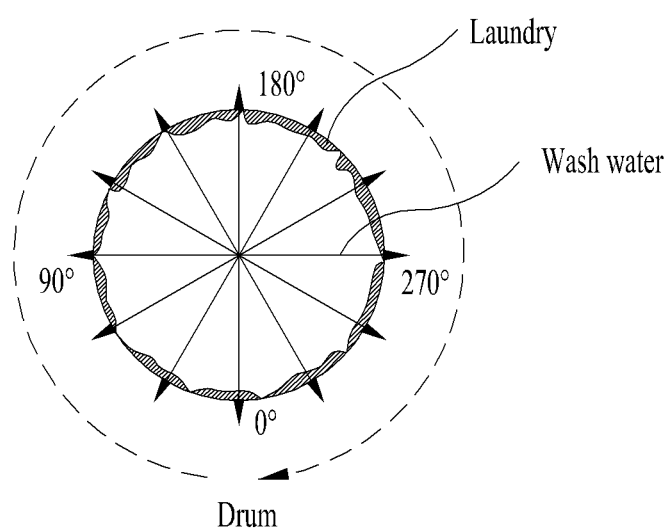

FIGS. 3 to 5 are diagrams illustrating a drum motion applied to a controlling method of a laundry machine according to the present invention. FIGS. 3 to 5 show the drum and motion of the laundry loaded in the drum, seen in front of the drum. To describe such the drum and the motion of the laundry in detail, rectangular coordinates may be set in a rotation center of the drum and first to fourth quadrants are set according to the rectangular coordinates as well-known in the art to which the present invention pertains.

A drum driving motion means combination of a rotational direction and a rotation speed of the drum. A falling direction and falling time of the laundry loaded in the drum may be differentiated according to the drum driving motion, such that the motion of the laundry may be differentiated in the drum. The drum driving motion can be realized by controlling of the motor.

The laundry may be moved upward by the lifter 310 and/or a frictional force with respect to the inner circumferential surface of the drum. A shock applied to the laundry can be differentiated by controlling of the rotational speed and the rotational direction of the drum. In other words, mechanical forces including a frictional force between laundry items, a frictional force between the laundry and the wash water and the force generated by the falling laundry can be differentiated. Specifically, a degree of striking or scrubbing the laundry for washing can be differentiated and a degree of scattering or turning the laundry may be differentiated as well.

Accordingly, the present invention can provide a controlling method of the laundry machine including various drum driving motions. Various drum motions are implemented according to specific steps composing each cycle and the laundry can be treated by using an optimal mechanical force, such that washing efficiency of the laundry can be enhanced. In addition, a long washing time can be prevented that might be generated by one uniform drum driving motion and the entire time taken by the long washing time can be reduced.

Meanwhile, to realize such the various drum driving motions, the motor may be a direct drive motor. In other words, the motor may be a direct drive motor including a stator retained to the rear portion of the tub 20 and a rotary rotor to drive the drum directly. A rotational direction and torque of the motor may be controlled and time delay or backlash can be prevented as much as possible, only to control the drum driving motion immediately.

In contrast, in an indirect drive motor having a pulley to indirectly transmit a rotational force of the motor to the shaft, a drum driving motion allowing time delay or backlash, for example, a tumbling driving or a spin driving may be realized. Accordingly, the indirect drive motor may not be preferred to realize various drum driving motions. Such the driving methods with respect to the motor and the drum are well-known to those skilled in the art to which the present invention pertains and detailed description of the driving methods will be omitted.

FIG. 3 is a diagram illustrating a rolling motion. In the rolling motion, the motor rotates the drum 30 in one direction and the laundry positioned on the inner circumferential surface of the drum is controlled to rise and fall to the lowest point from a point arranged approximately less than 90 degrees with respect to the rotational direction of the drum.

In other words, once the motor drives the drum approximately at 40 RPM, the laundry positioned at the lowest point of the drum 30 rises a predetermined height along the rotational direction of the drum 30 and moves like rolling to the lowest point of the drum from a point approximately at less than 90 degrees with respect to the rotational direction. The laundry looks like rolling from the third quadrant of the drum continuously in the clockwise direction rotation of the drum.

The laundry may be washed by friction with the wash water, friction between laundry items and friction with the inner circumferential surface of the drum in the rolling motion. Such the rolling motion may generate sufficient turning of the laundry to gain a washing effect of softly scrubbing the laundry.

In this instance, the RPM of the drum is determined based on a relation with a radius of the drum. As the RPM of the drum is getting higher, a stronger centrifugal force of the laundry can be generated in the drum. A difference between the centrifugal force and the gravity may differentiate the motion of the laundry in the drum. Of course, the frictional force between the rotational force of the drum and the laundry has to be put into consideration.

Accordingly, the rolling motion determines the RPM of the drum so as to make the centrifugal force and the frictional force less than the gravity (1 G).

FIG. 4 is a diagram illustrating a tumbling motion.

In the tumbling motion, the motor rotates the drum in one direction, while controlling the laundry positioned on the inner circumferential surface of the drum to fall to the lowest point of the drum from a point approximately at 90 to 110 degrees with respect to the rotational direction of the drum. The mechanical force is generated in the tumbling motion, only when the drum is rotated at an appropriate RPM. The tumbling motion is typically used in washing and rinsing cycles.

Specifically, the laundry loaded in the drum 30 is positioned at the lowest point of the drum 30 before the motor starts to drive. Once the motor provides a torque to the drum 30, the drum 30 starts to be rotated and the lifter 31 provided in the inner circumferential surface of the drum lifts the laundry to a predetermined height from the lowest point. If the motor rotates the drum 30 approximately at 46 RPM, the laundry may fall from a position approximately at 90 to 110 degrees with respect to the rotational direction toward the lowest point of the drum.

The tumbling motion generates a centrifugal force larger than the centrifugal force generated in the rolling motion and the RPM of the drum is determined to be less than the gravity.

Visually, in the tumbling motion, once the drum is rotated in the clockwise direction, the laundry falls to the lowest point out of the inner circumferential surface of the drum, after moving to a predetermined point of the second quadrant from the lowest point and the third quadrant of the drum.

Accordingly, the tumbling motion uses a shock generated by friction of the laundry with the wash water and falling of the laundry and it generates sufficient washing efficiency realized by an effect of slightly striking the laundry, using the shock. As it makes the laundry fall, out of the inner circumferential surface of the drum, the tumbling motion can have an effect of separating and scattering entangled-laundry.

FIG. 5 is a diagram illustrating a filtration motion. In the filtration motion, the motor rotates the drum 30 to make the laundry not separated from the inner circumferential surface of the drum by the centrifugal force, while the wash water is spraying in the drum.

In other words, in the filtration motion, the wash water is sprayed in the drum while the laundry is spread and rotated in close contact with the inner circumferential surface of the drum. The wash water can be drawn to the tub 20 via the penetrating hole 32 of the drum 30. Accordingly, the filtration motion can enlarge a surface area of the laundry and enables the wash water penetrate the wash water, such that an effect of uniformly supplying the wash water to the laundry can be gained.

A process of spraying the wash water in the drum 30 may be realized by the circulation passage and pump, although not shown in the drawing. The pump is in communication with a bottom of the tub 20 to press the wash water. One end of the circulation passage is connected to the pump and the wash water is sprayed into the drum via the other end of the circulation passage from an upper portion of the drum. The circulation passage and the pump mentioned above are necessary in case the wash water held in the tub is sprayed. The present invention may include an embodiment of spraying wash water into the drum via a spraying water supply passage connected to an external water supply source.

In other words, one end of the spray water supply passage is connected to the external water supply source and the other end thereof is connected to the tub. In this instance, only if a nozzle is provided to spray the wash water into the drum, the process of spraying the wash water into the drum can be implemented in the filtration motion.

Figure 6:
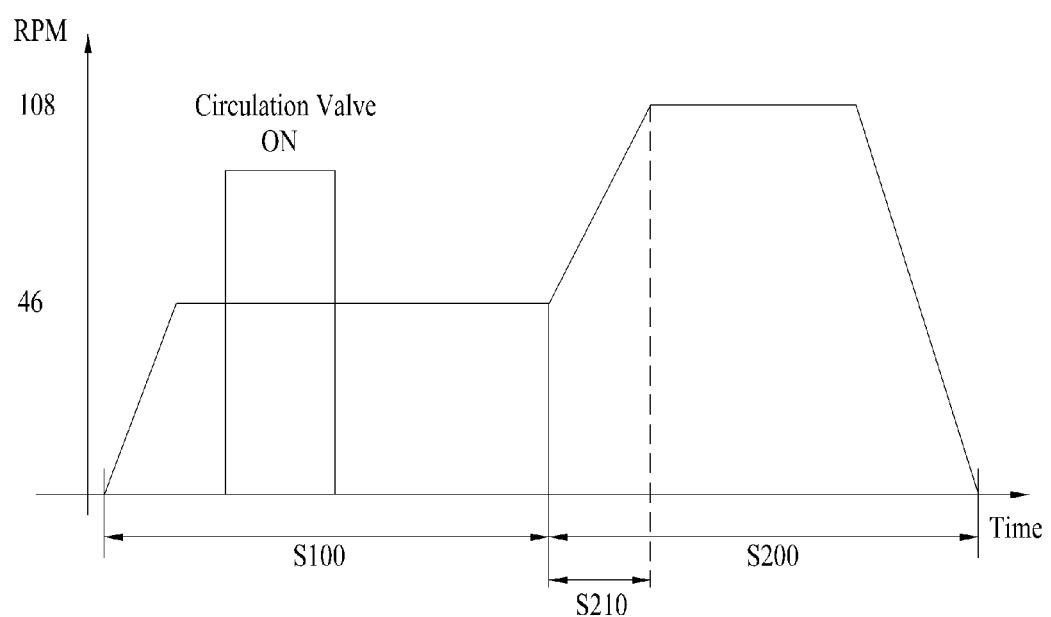
FIG. 6 is a diagram illustrating another drum motion applied to the controlling method of the laundry machine according to the present invention.

FIG. 6 is a diagram illustrating other drum motions applied to the control method of the laundry machine. Those drum motions will be described, referring to FIG. 6.

The controlling method of the laundry machine includes a low speed rotation step (S100) of rotating the motor configured to rotate the drum 30 at a relatively low speed; and a high speed rotation step (S200) of rotating the motor configured to rotate the drum 30 at a relatively high speed. At this time, the high speed rotation step (S200) includes an acceleration period (S210) in which a RPM of the motor increases after the motor reaches a target RPM of the low speed rotation step (S100).

As shown in FIG. 6, the target RPM of the low speed rotation step (S100) is approximately 46 RPM and it can be approximately 40 RPM.

In the low speed rotation step (S100), the motor is driven at the target RPM for a predetermined time period after reaching the target RPM and the RPM of the motor is heightened while passing the acceleration period (S210).

After that, the motor is driven at a specific RPM set in the high speed rotation step (S200). At this time, in the high speed rotation step (S200), the RPM of the motor is increased approximately to 108 RPM and the RPM is maintained approximately at 108 RPM for a predetermined time period.

The present invention is not limited to such RPM values. In the low speed rotation step (S100), the motor is driven at a relatively lower RPM than in the high speed rotation step (S200). The low speed rotation step (S100) increases the RPM of the motor, not decreasing, to enter into the high speed rotation step (S200).

At this time, the rolling motion or the tumbling motion may be implemented in the low speed rotation step (S100). The filtration motion may be implemented in the high speed rotation step (S200). As mentioned above, the rolling motion and the tumbling motion rotate the motor at a lower RPM than the filtration motion.

The falling of the laundry can be performed in the low speed rotation step (S100) and it is possible in the low speed rotation step (S100) to soak the laundry. In contrast, the laundry in close contact with the inner circumferential surface of the drum 30 is rotated in the high speed rotation step (S200) and it is possible in the high speed rotation step (S200) to separate wash water from the laundry.

Meanwhile, the wash water held in the tub 20 can be circulated by the circulation valve. The circulation valve may be open in a preset time period after the low speed rotation step (S100) starts. In other words, it is preferred that the circulation valve closes the passage until the valve is open. As soon as the low speed rotation step (S100) starts, the circulation valve is open and the wash water starts to be drawn into the circulation passage, which might be problem of insufficient wash water held in the tub finally.

Meanwhile, the open time of the circulation passage by the circulation valve may be shorter than the duration time of the low speed rotation step (S100). The circulation valve may close the circulation passage before the RPM of the motor enters into the acceleration period of the high speed rotation step. Of course, variations of the circulation valve opening start time and the open time may be made.

Figure 7:
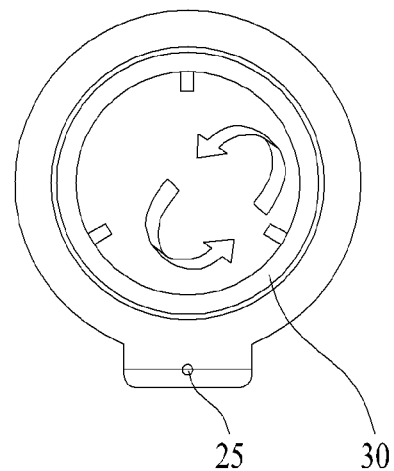
FIGS. 7 and 8 are diagrams illustrating a state of an inside of a drum having FIG. 6 applied thereto.
Figure 8:
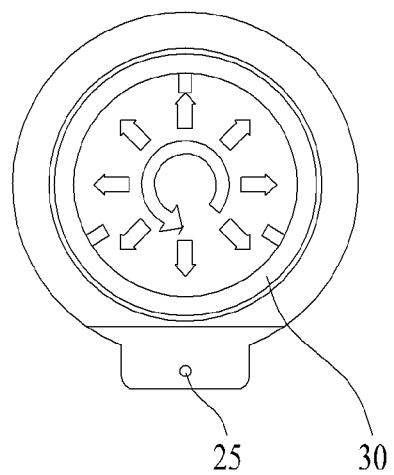

FIGS. 7 and 8 are diagrams illustrating an inner state of the drum having FIG. 6 applied thereto. Referring to FIGS. 7 and 8, the inner state of the drum will be described as follows.

FIG. 7 is a diagram illustrating the drum rotated in the low speed rotation step and FIG. 8 is a diagram illustrating the drum rotated in the high speed rotation step.

In the low speed rotation step (S100), the rolling motion or the tumbling motion may be implemented and the laundry can absorb the wash water held in the tub 20. Accordingly, the water level of the wash water may be lowered as shown in FIG. 7 and the heater 25 might be exposed outside.

Once the heater 25 is driven in a state of being exposed outside, not only the heater 25 but also the tub 20 or the drum adjacent to the heater 25 could be over-heated disadvantageously.

Meanwhile, in the high speed rotation step (S200), the filtration motion can be implemented and the wash water absorbed by the laundry can be exhausted from the laundry. Accordingly, the water level may be heightened as shown in FIG. 8 and the heater 25 is likely not to be exposed outside.

Specifically, even when the washing course is implemented with the predetermined amount of the wash water, the water level of the wash water can be differentiated according to whether the low speed rotation step (S100) or the high speed rotation step (S200) is implemented.

In other words, when the water level is measured in a state of the same amount of the wash water as shown in FIG. 7, the heater 25 is exposed outside and it is determined that additional wash water is supplied, only to start water supply. In contrast, when the water level is measured in a state of FIG. 8, the heater 25 is not exposed outside and it is determined that no additional wash water is supplied. No water supply starts.

Accordingly, as shown in FIG. 8, the water level of the tub 20 may be measured after the high speed rotation step (S200) finishes. In the present invention, more wash water is additionally supplied in a state where the wash water is substantially supplied. No more wash water is supplied at a water level at which the heater 25 could be exposed temporarily. Accordingly, the time taken by the additional water supply performed unnecessarily can be reduced and the time taken to implement the entire washing course may be prevented from increasing.

Figure 9:
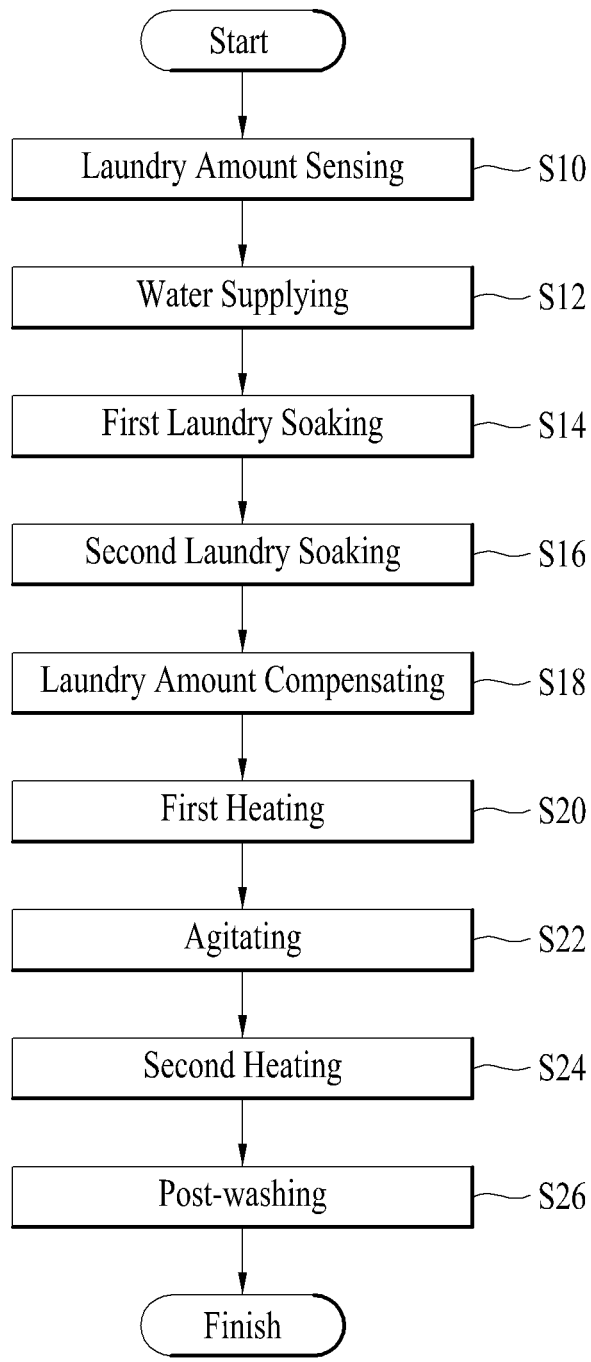
FIG. 9 is a flow chart illustrating the controlling method of the laundry machine according to the present invention.

FIG. 9 is a flow chart illustrating the controlling method of the laundry machine according to the present invention. Referring to FIG. 9, the controlling method will be described as follows.

A washing course performed in the laundry machine is as shown in FIG. 9.

First of all, a laundry amount sensing step of sensing the amount of laundry loaded in the drum may be implemented (S10). In the laundry amount sensing step, the amount of dry laundry before it is soaked by wash water may be sensed. At this time, the drum 30 may be rotated approximately 30 RPM in the laundry amount sensing step.

A water supplying step of supplying wash water to the laundry may be implemented according to the sensed amount of the laundry (S12). To soak the laundry in the wash water sufficiently, the drum 30 may be driven in the rolling motion.

Hence, a first laundry soaking step is implemented (S14). In the first laundry soaking step, the drum 30 may be driven in the rolling motion to continuously soak the laundry in the wash water supplied completely.

After that, a second laundry soaking step is implemented (S16). In the second laundry soaking step, the drum is driven to implement the low speed rotation step (S100) and the high speed rotation step (S200), different from in the first laundry soaking step.

The first laundry soaking step and the second laundry soaking step may be distinguished from each other by the type of the drum motion. Entirely, the laundry is soaked in the wash water via the laundry soaking step. In the former laundry soaking step, the rolling motion is implemented to soak the laundry sufficiently. However, in the latter laundry soaking step, even the high speed rotation step (S200) is implemented and the wash water contained in the laundry may be removed partially.

Hence, a laundry amount compensating step (S18) may be implemented to measure a water level inside the tub 20 additionally and to supply insufficient wash water additionally. Wash water may be additionally supplied in the laundry amount compensating step. Also, the laundry concentrated on a predetermined portion inside the drum 30 can be dispersed uniformly in the laundry amount compensating step.

In the laundry amount compensating step, the low speed rotation step (S100) and the high speed rotation step (S200) may be implemented. At this time, the low speed rotation step (S100) may be realized for a longer time period than the high speed rotations step (S200). The rolling motion or the tumbling motion can be implemented in the low speed rotation step (S100) and the filtration motion can be implemented in the high speed rotation step (S200), such that substantial washing may be performed only to reduce the duration time of the entire washing course may be reduced. Especially, when the low speed rotation step (S100) is implemented approximately for 24 seconds, the high speed rotation step (S200) may be implemented approximately for 6 seconds.

Hence, a first heating step (S20) may be implemented to drive the heater 25. In the first heating step (S20), the heater 25 is driven and the wash water held in the tub is heated. At this time, the low speed rotations step (S100) and the high speed rotation step (S200) may be implemented.

Especially, it is preferred that the low speed rotation step (S100) and the high speed rotation step (S200) may finish before the heater 25 is driven. As shown in FIG. 7, the heater 25 might be exposed to external air even if the same wash water is supplied during the low speed rotation step (S100). In contrast, as shown in FIG. 8, when the high speed rotation step (S200) is implemented, the wash water contained in the laundry is exhausted from the laundry to prevent the heater 25 from being exposed to the external air.

After that, an agitating step (S22) is implemented to agitate the wash water and the laundry. In the agitating step, the rolling motion and the filtration motion may be implemented independently. In other words, the rolling motion is realized for a preset time period and the RPM of the motor reaches a target RMP before it is reduced again. Then, the RPM of the motor may be increased to implement the filtration motion.

After the agitating step, a second heating step is implemented (S24). Even in the second heating step, the heater 25 may be driven and the wash water may be heated. Similar to the first heating step, in the second heating step, the low speed rotations step (S100) and the high speed rotation step (S200) may finish before the heater 25 starts to drive. As shown in FIG. 7, even when the same amount of the wash water is supplied, the heater 25 could be exposed to external air during the low speed rotation step (S100). In contrast, as shown in FIG. 8, when the high speed rotation step (S200) is implemented, the wash water contained in the laundry is partially exhausted outside to prevent the heater 25 from being exposed to external air.

Hence, a post-washing step is implemented (S26). In the post-washing, the filtration motion may be implemented and the tumbling motion may be implemented several times. Even in the post-washing step, the filtration motion may be implemented and the tumbling motion may be implemented in a state where the RPM of the motor is decreased after that.

Figure 10:
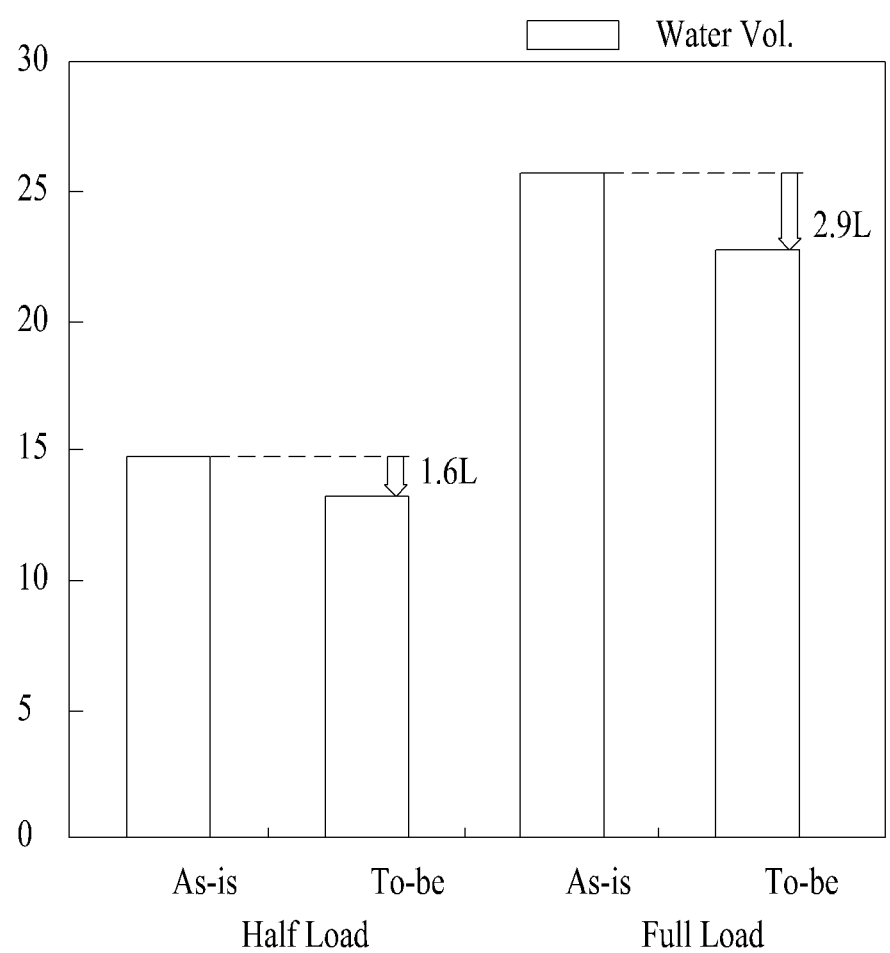
FIG. 10 is a graph illustrating an effect of the present invention.

FIG. 10 is a graph illustrating the effects of the present invention. Referring to FIG. 10, the effects of the present invention will be described as follows. In FIG. 10, 'Half Load' means that the load of the laundry loaded in the drum is corresponding to the half of the maxim load. 'Full Load' means that the load of the laundry loaded in the drum is corresponding to the maxim load, namely, the full load.

FIG. 10 shows the result of experiments that substantially compare the amount of the wash water used in two loads in the prior art (As-is) with the amount of the wash water in the present invention (To-be).

According to the result of the experiments in case of Half Load, it is shown that approximately 15 L of wash water is used in the prior art and only 13.4 L that is reduced from 15 L approximately by 1.6 L is used in the present invention.

Similarly, according to the result of the experiments in case of Full Load, approximately 15 L of wash water is used in the conventional laundry machine and only 22.1 L reduced from 25 L approximately by 2.9 L is used in the laundry machine of the present invention.

Therefore, compared with the conventional controlling method of the prior art, the controlling method of the laundry machine according to the present invention, the amount of the wash water used in the washing course can be reduced. Also, the amount of the used wash water is reduced and the additional water supply time for supplying wash water can be reduced. Accordingly, the time taken to implement the entire washing course may be reduced.

Various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A controlling method of a laundry treating apparatus including a cabinet defining an exterior appearance thereof, a tub, a water level sensor measuring a water level of the tub, a heater provided in the tub adjusting a temperature of a wash water of the tub, the controlling method comprising:
   a first speed rotation step of rotating a motor configured to rotate a drum mounted in a tub at a first speed;
   a second speed rotation step of rotating the motor at a second speed, the second speed being higher than the first speed, the second speed rotation step implemented after the first speed rotations step;
   measuring the water level of the tub using the water level sensor; and
   supplying an additional amount of wash water in response to the measuring water level step,
   wherein the second speed rotation step comprises an acceleration period in which a RPM of the motor is increased after the RPM of the motor reaches a target RPM of the first speed of the first speed rotation step,
   wherein the measuring water level step is implemented after the second speed rotation step, and
   wherein the supplying wash water step is implemented after the measuring water level step.

2. The controlling method of the laundry machine according to claim 1, wherein in the first speed rotation step, the motor is driven at the target RPM for a predetermined time period after the RPM of the motor reaches the target RPM.

3. The controlling method of the laundry machine according to claim 1, wherein a rolling motion or a tumbling motion is implemented in the first low speed rotation step.

4. The controlling method of the laundry machine according to claim 1, wherein a filtration motion is implemented in the second speed rotation step.

5. The controlling method of the laundry machine according to claim 4, wherein a circulation valve closes a circulation passage until the circulation valve is open.

6. The controlling method of the laundry machine according to claim 1, wherein the first speed rotation step and the second speed rotation step are implemented in a heating step.

7. The controlling method of the laundry machine according to claim 6, wherein the first speed rotation step and the second speed rotation step are implemented in the heating step, before a heater starts to drive.

8. The controlling method of the laundry machine according to claim 1, wherein a circulation valve is open in a preset time period after the first speed rotations step starts.

9. The controlling method of the laundry machine according to claim 1, wherein the first speed rotation speed is realized for a longer time period than the second speed rotation step.

10. The controlling method of the laundry machine according to claim 1, wherein the first speed rotation step and the second speed rotation step are implemented in a laundry soaking step.

11. The controlling method of the laundry machine according to claim 10, wherein the first speed rotation step and the second speed rotation step are implemented after a rolling motion is implemented.

12. The controlling method of the laundry machine according to claim 1, wherein the first speed rotation step and the second speed rotation step are implemented in a laundry amount compensating step, after a laundry soaking step finishes.

13. A controlling method of a laundry machine including a cabinet defining an exterior appearance thereof, a tub, a water level sensor measuring a water level of the tub, a heater provided in the tub adjusting a temperature of a wash water of the tub comprising:
   a first speed rotations step of rotating a motor configured to rotate a drum at a first speed to make laundry fall after rising a predetermined height along a rotational direction of a drum; and
   a second speed rotation step of rotating the motor at a second speed to make the laundry not separated from an inner circumferential surface of the drum, the second speed being higher than the first speed, the second speed rotation step implemented after the first speed rotation step,
   measuring the water level of the tub using the water level sensor; and
   supplying an additional amount of wash water in response to the measuring water level step,
   wherein the second speed rotation step includes an acceleration period in which a RPM of the motor increases after the speed of the motor reaches a target RPM of the first speed rotation step,
   wherein the measuring water level step is implemented after the second speed rotation step, and
   wherein the supplying wash water step is implemented after the measuring water level step, and
   a circulation valve is open in a preset time period after the first speed rotation step starts.

14. The controlling method of the laundry machine according to claim 13, wherein the time for which a circulation passage is open by the circulation valve is shorter than the time for which the first speed step is complete.

15. The controlling method of the laundry machine according to claim 14, wherein the circulation valve closes the circulation passage before the second speed rotation step enters into the acceleration period.

16. A controlling method of a laundry machine comprising:
a first speed rotation step of rotating a motor configured to rotate a drum at a first speed to make laundry fall after rising a predetermined height along a rotational direction of a drum; and
a second speed rotation step of rotating the motor at a second speed to make the laundry not separated from an inner circumferential surface of the drum, the second speed being higher than the first speed, the second speed rotation step serially implemented after the first speed rotation step;
measuring the water level of the tub using the water level sensor;
supplying an additional amount of wash water in response to the measuring water level step, and
a heating step of driving a heater to heat wash water,
wherein the second speed rotation step includes an acceleration period in which a RPM of the motor increases after the RPM of the motor reaches a target RPM of the first speed rotation step, and
wherein the measuring water level step is implemented after the second speed rotation step,
wherein the supplying wash water step is implemented after the measuring water level step, and
a circulation valve is open in a preset time period after the first speed rotation step starts.

17. The controlling method of the laundry machine according to claim 16, wherein the first speed rotation step and the second speed rotation step finish before the heater starts to drive in the heating step.

18. The controlling method of the laundry machine according to claim 16, wherein the circulation valve closes a circulation passage before the second speed rotations step enters into the acceleration period.

* * * * *